United States Patent [19]

Komura et al.

[11] Patent Number: 5,281,095
[45] Date of Patent: Jan. 25, 1994

[54] VARIABLE-PITCH MECHANISM FOR A PROPELLER

[75] Inventors: Takashi Komura; Takashi Bannai, both of Saitama, Japan

[73] Assignee: Honda Giken Kogyo Kabushiki Kaisha, Tokyo, Japan

[21] Appl. No.: 985,528

[22] Filed: Dec. 3, 1992

Related U.S. Application Data

[63] Continuation of Ser. No. 631,668, Dec. 12, 1990, abandoned.

[51] Int. Cl.$^5$ .............................................. B63H 3/00
[52] U.S. Cl. .................................. 416/147; 416/156; 416/158; 416/167
[58] Field of Search ............... 416/147, 167, 154, 156, 416/158

[56] References Cited

U.S. PATENT DOCUMENTS

| | | | |
|---|---|---|---|
| 2,850,106 | 9/1958 | Swan | 416/167 |
| 2,925,131 | 2/1960 | Willi . | |
| 3,163,231 | 12/1964 | Barnes et al. . | |
| 3,242,992 | 3/1966 | Quenneville et al. | 416/158 |
| 3,567,340 | 3/1971 | Schneider et al. . | |
| 4,643,643 | 2/1987 | Otto | 416/158 |
| 5,090,869 | 2/1992 | Wright | 416/156 |

FOREIGN PATENT DOCUMENTS

| | | | |
|---|---|---|---|
| 1003912 | 3/1957 | Fed. Rep. of Germany | 416/167 |
| 3205216 | 9/1982 | Fed. Rep. of Germany . | |
| 134800 | 10/1980 | Japan | 416/167 |
| 149890 | 8/1984 | Japan | 416/158 |
| 77593 | 4/1986 | Japan | 416/158 |
| 77594 | 4/1986 | Japan | 416/158 |
| 200730 | 6/1983 | Netherlands | 416/167 |
| 2051966 | 1/1981 | United Kingdom | 416/167 |
| 2051967 | 1/1981 | United Kingdom | 416/167 |

Primary Examiner—John T. Kwon
Attorney, Agent, or Firm—Lyon & Lyon

[57] ABSTRACT

A variable-pitch mechanism, for use in an airplane, a ship, or the like, for adjusting the pitch of a plurality of blades of a propeller in which attachment shafts of a plurality of radial blades of a propeller are rotatably mounted on a tubular hub which can be driven by a drive shaft, and eccentric pins projecting from ends of the attachment shafts are held in an annular groove defined in the outer periphery of an adjusting ring which is disposed concentrically in the hub and axially movable. The attachment shafts can be turned about their own axes through the eccentric pins in response to axial displacement of the adjusting ring for adjusting the pitch of the propeller blades.

12 Claims, 3 Drawing Sheets

VARIABLE-PITCH MECHANISM FOR A PROPELLER

This application is a continuation of application Ser. NO. 07/631,668 filed Dec. 12, 1990, now abandoned.

BACKGROUND OF THE INVENTION

The field of the present invention relates to a variable-pitch mechanism for use in an airplane, a ship, or the like, and more particularly to a mechanism for adjusting the pitch of a plurality of blades of a propeller.

Heretofore there have been proposed various variable-pitch mechanisms employing a rack and pinion, a cam, a link, and the like, but the conventional mechanisms have been costly since they are complex in structure and difficult to machine.

It is an object of the present invention to provide a variable-pitch mechanism which is of a simple structure and can be machined with ease.

SUMMARY OF THE INVENTION

An object of the present invention is to provide an improved variable-pitch mechanism for use in an airplane, a ship, or the like, and more particularly to provide a simplified but dependable mechanism for adjusting the pitch of a plurality of blades of a propeller.

According to a first feature of the present invention, the attachment shafts of a plurality of radial blades of a propeller are rotatably mounted on a tubular hub which can be driven by a drive shaft, and eccentric pins projecting from ends of the attachment shafts are held in an annular groove defined in the outer periphery of an adjusting ring which is disposed concentrically in the hub and axially movable. The attachment shafts can be turned about their own axes through the eccentric pins in response to axial displacement of the adjusting ring. When the adjusting ring is moved axially, all the eccentric pins engaging in the common annular groove are driven axially and circumferentially of the adjusting ring, thereby rotating the attachment shafts about their own axes, so that the pitch of all the propeller blades can simultaneously be adjusted.

According to a second feature of the present invention, in addition to the above feature, one side wall of the annular groove has slots defined therein for allowing the eccentric pins to pass therethrough into the annular groove, and the adjusting ring has a retainer means for holding the eccentric pins in the annular grooves in positions displaced from the slots. Since the eccentric pins on the respective attachment shafts can be guided into the annular groove through the respective slots in the side wall of the annular groove, the variable-pitch mechanism can be assembled with ease. Inasmuch as the eccentric pins are normally held in positions displaced from the slots by the retainer means, the eccentric pins are reliably prevented from being removed from the annular groove.

According to a third feature of the present invention, in addition to the first feature, the eccentric pins engage in the annular groove through sliders in which the eccentric pins are rotatably fitted. As such, the eccentric pins can smoothly be driven by the adjusting ring in response to relative rotation of the eccentric pins and the sliders.

According to a fourth feature of the present invention, in addition to the third feature, the sliders are each of a square cross section held in face-to-face contact with opposite side wall surfaces defining the annular groove. As such, the sliders are held against the side wall surfaces of the annular groove through wide contact areas, and hence the pressure applied to the contact areas is low.

DETAILED DESCRIPTION OF A PREFERRED EMBODIMENT

Figure 1:
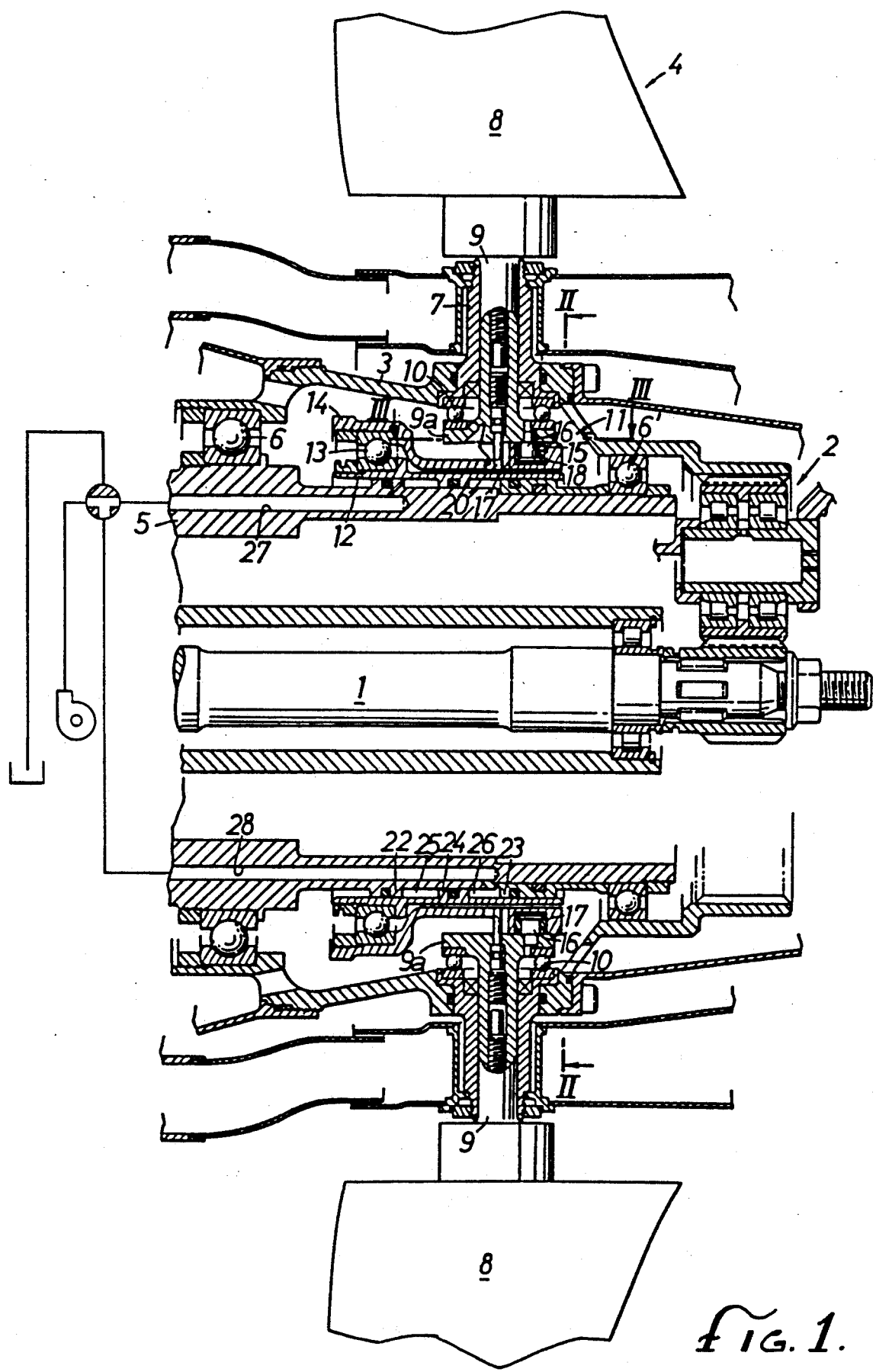
FIG. 1 is a vertical cross-sectional view of a rotating propeller propulsion system with a variable-pitch mechanism according to the present invention.
Figure 1A:
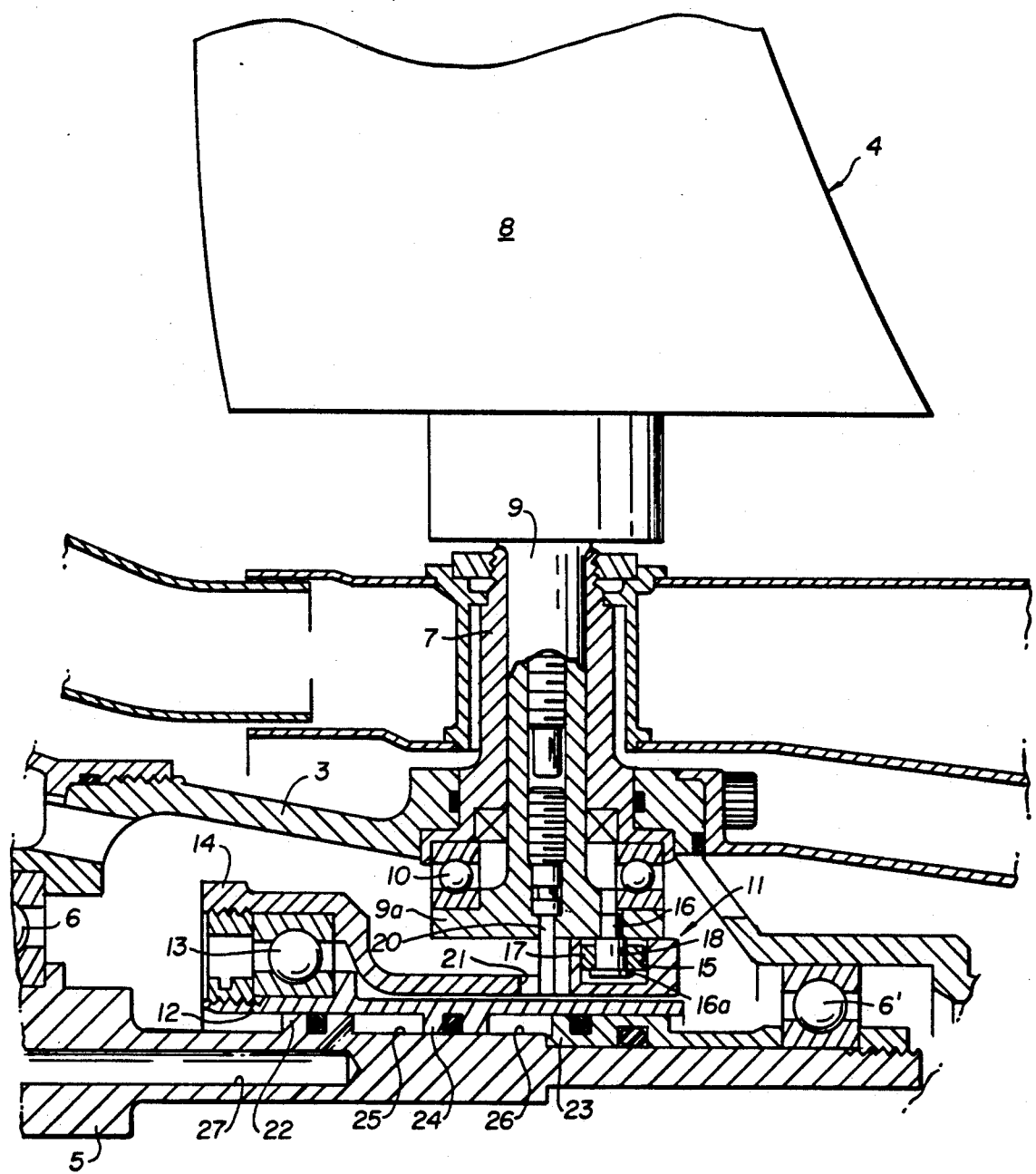
FIG. 1A is a detailed view of the variable-pitch mechanism portion of the system of FIG. 1.
Figure 2:
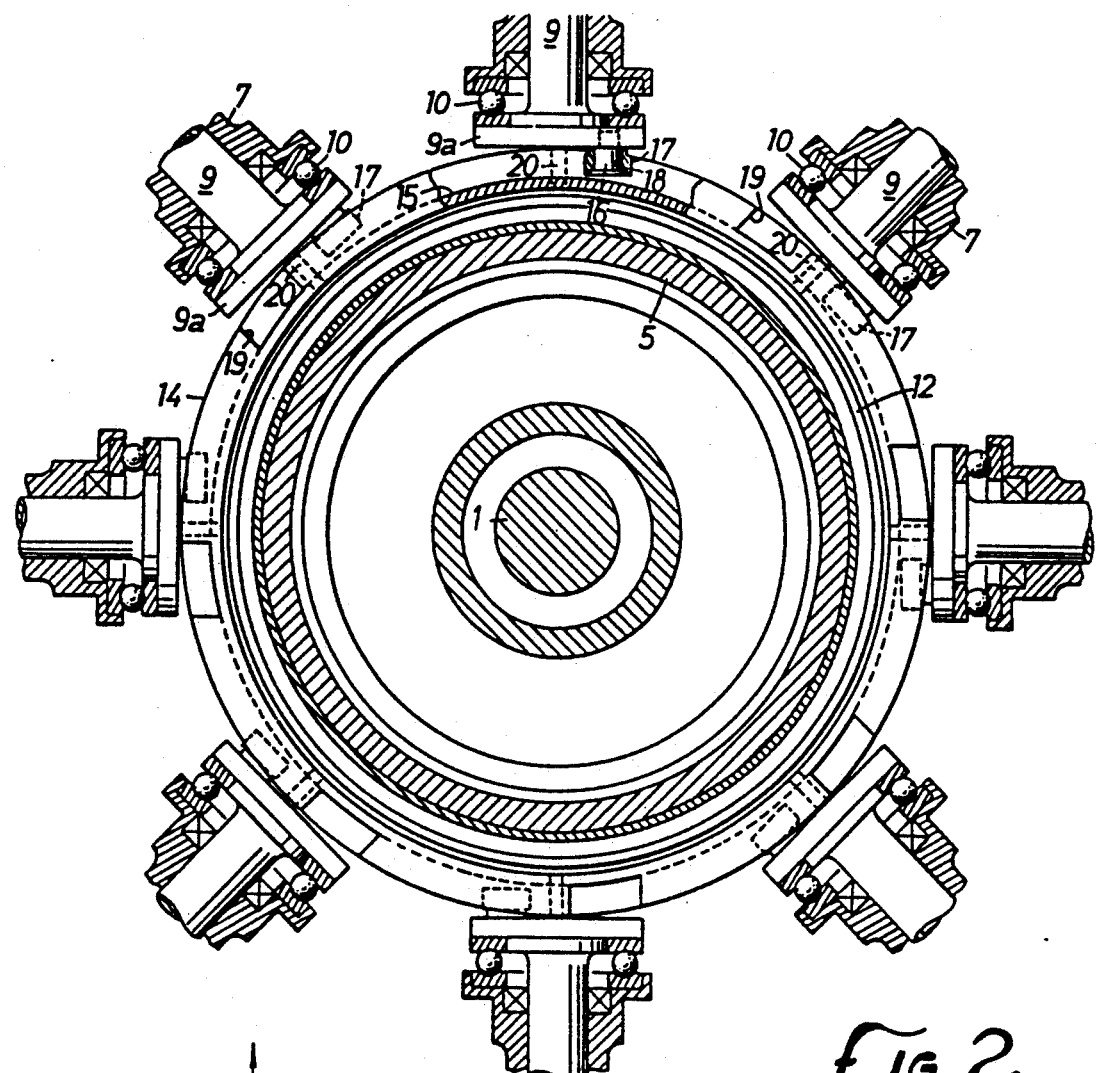
FIG. 2 is a cross-sectional view of the system in FIG. 1 taken along line II—II of FIG. 1.

A preferred embodiment of the present invention which is incorporated in an airplane will now be described with reference to the drawings. A rotating propeller propulsion system is shown in FIGS. 1, 1A and 2, in which output power from a drive shaft 1 of a gas turbine engine or the like is transmitted through a speed reducer gear mechanism 2 to a tubular hub 3 to drive the hub 3 to rotate a propeller 4.

The hub 3 is supported by a pair of bearings 6, 6' on the outer periphery of a support cylinder 5 joined to a supporting structural body (not shown) of the engine and surrounding the drive shaft 1. An annular array of support tubes 7 is fixedly mounted on the hub 3, with the support tubes 7 extending radially through the peripheral wall of the hub 3. The propeller 4 comprises a plurality of blades 8 having respective attachment shafts 9 rotatably fitted respectively in the support tubes 7. Thrust bearings 10 are interposed between flanges 9a on the inner ends of the attachment shafts 9 and the support tubes 7. Therefore, when the hub 3 is driven to rotate around the support cylinder 5 in one direction, the blades 8, i.e., the propeller can be rotated in the same direction through the support tubes 7 and shafts 9.

The pitch of the blades 8 can be varied by turning the attachment shafts 9 thereof through a variable-pitch mechanism 11 which is constructed as follows.

The variable-pitch mechanism 11 comprises a movable cylinder 12 disposed between the bearings 6, 6' in surrounding relation to the support cylinder 5 and reciprocally operable in the axial direction, and an adjusting ring 14 surrounding the movable cylinder 12 and coupled thereto through a bearing 13. The adjusting ring 14 is disposed concentrically in the hub 3 and is axially immovable, but rotatable with respect to the movable cylinder 12.

The adjusting ring 14 has an annular groove 15 defined in an outer peripheral surface thereof. Eccentric pins 16 projecting respectively from the radially inner ends of the flanges 9a of the attachment shafts 9 are slidably held in the annular groove 15 through sliders 17 mounted on the respective eccentric pins 16. Each of the sliders 17 is of a square cross section having sides held in face-to-face contact with opposite surfaces defining the annular groove 15 (see FIG. 3). The sliders 17 have pin holes 18 defined centrally therein with the eccentric pins 16 being rotatably fitted respectively in the pin holes 18.

The eccentric pins 16 have end flanges 16a of a larger diameter for preventing the sliders 17 from being dislodged therefrom.

The sliders 17 can simultaneously be guided into the annular groove 15 through a number of respective slots 19 defined in a rear side wall of ring 14 which defines the annular groove 15. Retainer pins 20 fixed as retainer means centrally on the respective attachment shafts 9 are fitted respectively in positioning holes 21 defined in the adjusting ring 14 for retaining the sliders 17 in the annular groove 15 in positions displaced from the respective slots 19. The positioning holes 21 are in the form of oblong holes with their longer or major axes directed axially of the adjusting ring 14 to allow the adjusting ring 14 to move axially without being obstructed by the retainer pins 20.

The movable cylinder 12 is slidably fitted over a pair of front and rear fixed pistons 22, 23 formed o the outer periphery of the support cylinder 5. The movable cylinder 12 has a partition 24 on a central portion of an inner wall surface thereof. The fixed cylinders 22, 23 and the partition 24 positioned therebetween jointly define front and rear oil chambers 25, 26 around the support cylinder 5.

The peripheral wall of the support cylinder 5 has first and second oil passages 27, 28 defined therein and communicating with the first and second oil chambers 25, 26, respectively, for supplying the first and second oil chambers 25, 26 with oil under pressure from an oil pressure source through a control valve (not shown).

The operation of the variable-pitch mechanism according to this embodiment will now be described.

Figure 3:
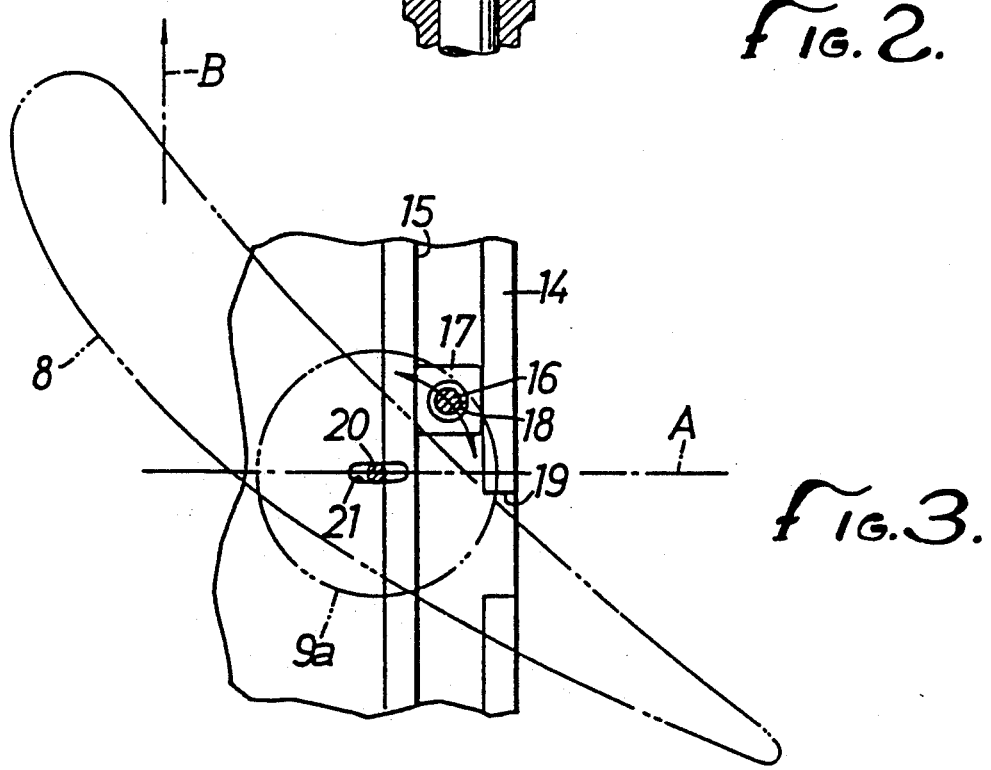
FIG. 3 is an enlarged cross-sectional view taken along line III—III of FIG. 1.

FIGS. 1 and 3 show that the blades 8 are in a medium pitch condition. In this condition, the partition 24 of the movable cylinder 12 is held in an intermediate position centrally between the front and rear pistons 22, 23. The eccentric pins 16 are positioned rearwardly of the respective attachment shafts 9 and are spaced at about 45° from the axis A of the adjusting ring 14 in the direction (indicated by the arrow B) in which the propeller 4 rotates.

The non-illustrated control valve is now operated to release oil pressure from the rear oil chamber 26 and supply oil pressure into the front oil chamber 25, thus moving the movable cylinder 12 with the adjusting ring 14 in the rearward direction (to the right in FIG. 1). Since the adjusting ring 14 then displaces all the eccentric pins 16 rearwardly and laterally through the sliders 17 slidably engaging in the common annular groove 15, the attachment shafts 9 are rotated about their own axes to angularly displace all the blades 8 for a lower pitch.

Conversely, when the front oil chamber 25 is released from oil pressure and the rear oil chamber 26 is supplied with oil pressure, the movable cylinder 12 and the adjusting ring 14 are moved forwardly (to the left in FIG. 1) to cause the sliders 17 to drive the eccentric pins 16 forwardly and laterally to turn the attachment shafts 9 about their own axes. All the blades 8 are now angularly displaced for a higher pitch.

During such pitch adjustment, the sliders 17 slide in the annular groove 15, and the eccentric pins 16 are rotated with respect to the sliders 17. Therefore, the eccentric pins 16 are smoothly driven in response to axial movement of the adjusting ring 14. Since the sliders 17 of a square cross section are held against the side wall surfaces of the annular groove 15 through wide contact areas, the pressure applied to the contact areas of the sliders 17 is low and hence wear on the sliders 17 is small, making the sliders 17 highly durable.

While the propeller 4 is being rotated by the hub 3, the adjusting ring 14 is rotated in unison with the propeller 4 by the retainer pins 20. Inasmuch as the adjusting ring 14 is coupled to the movable cylinder 12 only through the bearing 13, the movable cylinder 12 is not rotated upon the rotation of the propeller 4.

ADVANTAGES OF THE INVENTION

Certain of the advantages achieved by the present invention will now be described.

According to a first feature of the present invention, as described above, the attachment shafts of a plurality of radial blades of a propeller are rotatably mounted on a tubular hub which can be driven by a drive shaft, and eccentric pins projecting from ends of the attachment shafts are held in an annular groove defined in the outer periphery of an adjusting ring which is disposed concentrically in the hub and axially movable. The attachment shafts can be turned about their own axes through the eccentric pins in response to axial displacement of the adjusting ring. Therefore, the pitch of all the propeller blades can simultaneously be adjusted by axially moving the adjusting ring. Since the annular groove of the adjusting ring is of a simple shape with only the eccentric pins on the blade attachment shafts slidably engaging in the annular groove, the variable-pitch mechanism is simple in structure, can be machined with ease, and is of a low cost.

According to a second feature of the present invention, one side wall of the annular groove has slots defined therein for allowing the eccentric pins to pass therethrough into the annular groove, and the adjusting ring has a retainer means for holding the eccentric pins in the annular grooves in positions displaced from the slots. Therefore, the eccentric pins can be placed in the annular groove of the adjusting ring while the eccentric pins are being mounted on the attachment shafts. Consequently, the variable-pitch mechanism can be assembled with ease.

According to a third feature of the present invention, the eccentric pins engage in the annular groove through sliders in which the eccentric pins are rotatably fitted, so that the eccentric pins can smoothly be driven by the adjusting ring for reliable operation.

According to a fourth feature of the present invention, the sliders are each of a square cross section held in face-to-face contact with opposite side wall surfaces defining the annular groove. Consequently, the pressure applied to contact areas between the sliders and the side wall surfaces of the annular groove is kept at a low level, reducing wear on the sliders and making the sliders durable.

Thus a mechanism for adjusting the pitch of a plurality of blades of a propeller has been shown and described. Though particular embodiments and advantages have been disclosed, modifications and advantages may become apparent to one skilled in the art from the disclosure herein. The invention is therefore not to be limited except in the spirit of the claims that follow.

What is claimed is:

1. A variable-pitch mechanism for a propeller, characterized in that attachment shafts of a plurality of radial blades of a propeller are rotatably mounted on a tubular hub which can be driven by a drive shaft, and eccentric pins projecting from ends of the attachment shafts are held in an annular grove defined in the outer periphery of an adjusting ring, the adjusting ring being rotationally mounted on an axially movable cylinder through a bearing, the adjusting ring being positioned concentrically in the tubular hub, rotating therewith and axially movable thereto, the arrangement being such that the attachment shafts can be turned about their own axes through the eccentric pins in response to axial displacement of the adjusting ring.

2. A variable-pitch mechanism according to claim 1, wherein one side wall of the annular groove has slots defined therein for allowing the eccentric pins to pass therethrough into the annular groove, and the adjusting ring has a retainer means for holding the eccentric pins in the annular grooves in positions displaced from the slots.

3. A variable-pitch mechanism according to claim 1, wherein the eccentric pins engage in the annular groove through sliders in which the eccentric pins are rotatably fitted.

4. A variable-pitch mechanism according to claim 3, wherein each of the sliders has a square cross section held in face-to-face contact with opposite side wall surfaces defining the annular groove.

5. A variable-pitch mechanism for a propeller having a plurality of radial blades with attachment shafts rotatably mounted on a tubular hub driven to drive the propeller with the tubular hub being rotatably supported on a stationary support cylinder through bearings, an adjusting ring rotationally mounted on an axially movable cylinder through a bearing, the adjusting ring being positioned with said tubular hub to rotate therewith and to be axially movable thereto, an annular groove defined in the adjusting ring, eccentrically located means provided on each attachment shaft for engaging said annular groove, and means for selectively moving said adjusting ring in an axial direction for causing the attachment shafts to turn about their own axes through the interengagement of the eccentrically located means and annular groove to adjust the pitch of the blades.

6. A variable-pitch mechanism according to claim 5, wherein the eccentrically located means comprise an eccentric pin projecting from an end of each attachment shaft.

7. A variable-pitch mechanism according to claim 6, wherein the eccentric pins engage in the annular groove through sliders in which the eccentric pins are rotatably fitted.

8. A variable-pitch mechanism according to claim 7, wherein each of the sliders has a square cross section held in face-to-face contact with opposite side wall surfaces defining the annular groove.

9. A variable-pitch mechanism according to claim 5 further comprising means restricting relative axial movement between the tubular hub and the movable cylinder, said movable cylinder having hydraulic means cooperating with the stationary support cylinder for selectively moving the movable cylinder in an axial direction.

10. A variable-pitch propeller system, comprising
a drive shaft;
a stationary support cylinder;
a cylindrical hub concentric with the drive shaft and operably connected thereto, the cylindrical hub being rotationally mounted upon the stationary support cylinder through bearings;
an adjusting ring disposed concentrically within the cylindrical hub rotating therewith and being axially movable relative thereto;
a movable cylinder supported on the stationary support cylinder and axially movable thereto; and
a plurality of tubular supports spaced about and extending radially outward from the cylindrical hub and attached thereto, wherein each tubular support has associated therewith:
a radial blade having an attachment shaft rotatably mounted within the tubular support, and
an eccentric pin projecting from an end of the attachment shaft and held in an annular groove defined in the outer periphery of the adjusting ring,
wherein the adjusting ring is rotationally mounted on the movable cylinder through a bearing and axially movable therewith and
wherein the attachment shaft is turned about its own axis through the eccentric pin in response to axial movement of the adjusting ring.

11. A variable-pitch propeller system according to claim 10, further comprising hydraulic actuation means for actuating the movable cylinder.

12. A variable-pitch propeller system according to claim 10 wherein one side wall of the annular groove has slots defined therein for allowing the eccentric pins to pass therethrough into the annular groove, and the adjusting ring has a retainer means for holding the eccentric pins in the annular groove in positions displaced from the slots.

* * * * *